C. VALLONE & F. R. ROGERS.
SECURING DEVICE FOR BEDSTEAD FRAMES.
APPLICATION FILED MAR. 29, 1909.
950,311.  Patented Feb. 22, 1910.
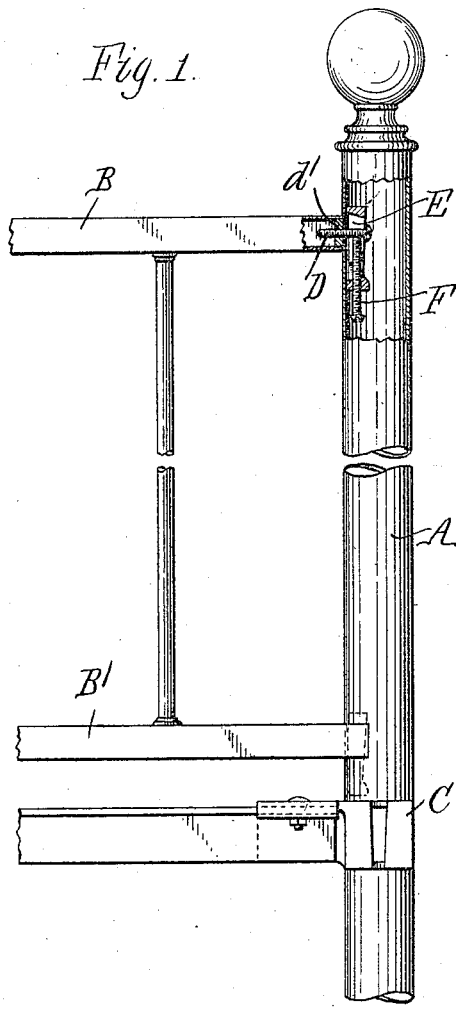
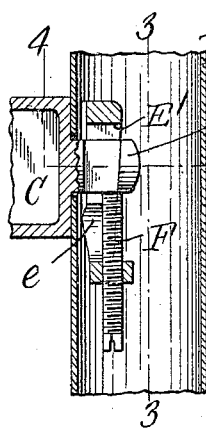
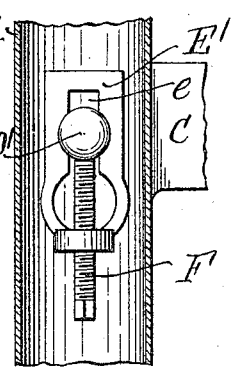
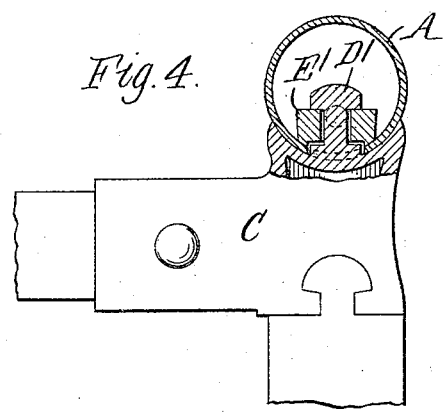
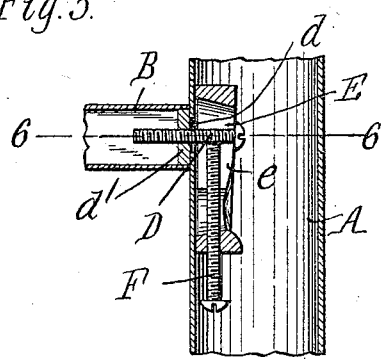
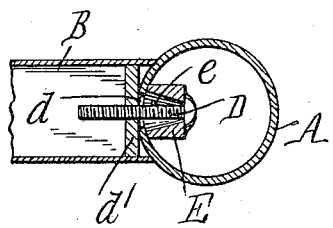
Witnesses.
A. G. Dimond
E. A. Volk
Inventors.
Charles Vallone,
Frank R. Rogers
By Wilhelm, Parker & Hasel,
Attorneys.

UNITED STATES PATENT OFFICE.

CHARLES VALLONE AND FRANK R. ROGERS, OF BUFFALO, NEW YORK, ASSIGNORS TO BARCALO MANUFACTURING COMPANY, OF BUFFALO, NEW YORK.

SECURING DEVICE FOR BEDSTEAD-FRAMES.

950,311.  Specification of Letters Patent.  Patented Feb. 22, 1910.

Application filed March 29, 1909. Serial No. 486,521.

*To all whom it may concern:*

Be it known that we, CHARLES VALLONE and FRANK R. ROGERS, citizens of the United States, residing at Buffalo, in the county of Erie and State of New York, have invented a new and useful Improvement in Securing Devices for Bedstead-Frames, of which the following is a specification.

This invention relates to improvements in securing or connecting devices employed in tubular structures, such as metal bedstead frames, for fastening a tube or other device to another tube between the ends thereof.

The object of the invention is to produce a connecting or securing device of simple and inexpensive construction which can be readily operated to draw the parts tightly together and will hold them firmly and rigidly and which will be wholly inclosed and hidden from view and will not mar or disfigure the tubes.

In the accompanying drawings: Figure 1 is an elevation, partly in section, of a portion of a metal bedstead end frame in which securing devices embodying the invention are employed. Fig. 2 is an enlarged sectional elevation of a portion of one of the pillars with a corner fastening member attached thereon by one of the securing devices. Fig. 3 is a sectional elevation thereof in line 3—3, Fig. 2. Fig. 4 is a plan view partly in section, in line 4—4, Fig. 2. Fig. 5 is an enlarged sectional elevation of a portion of a pillar and cross tube connected by one of the securing devices. Fig. 6 is a horizontal section thereof in line 6—6, Fig. 5.

Like letters of reference refer to like parts in the several figures.

A represents one of the corner posts or pillars of a bedstead end frame, B and B' respectively the upper and lower cross bars or tubes which are secured at their ends to and connect the pillars, and C the stationary lug or member of one of the corner fastenings which is mounted on the pillar and adapted to detachably interlock with the other member of the corner fastening carried by the bedstead side rail. These parts are usual in tubular metal bedstead frames and may be of ordinary construction.

The ends of the cross tubes and also the corner fastening members C are secured to the pillar by the securing devices forming the subject of the invention, and which will now be described.

D represents a stud which projects from the end of the cross tube and is provided at its outer end with a head or enlargement adapted to be inserted into the pillar through a hole $d$ in the side thereof, see Fig. 5. The stud preferably consists of a screw screwed into a nut or gromet $d'$ which is firmly secured in the end of the cross tube by soldering or in any other usual or suitable manner.

E represents a movable wedge-block which is arranged in the pillar and bears against the side thereof against which the end of the cross tube abuts. The block is tapered or wedge-shaped and has an elongated keyhole slot $e$ extending through it, the enlarged part of which is of sufficient size for the head of the stud to pass through it. The wedge is slipped over the head of the stud and is then moved endwise to cause the shank of the stud to enter the narrow part of the slot and the head to bear on the inclined face of the wedge at opposite sides of the slot. A screw F passing through a threaded hole in a boss at the small end of the wedge extends lengthwise into the narrow portion of the key-hole slot and is adapted to bear at its inner end against the stud D. By driving in the screw, the wedge is forcibly moved endwise relative to the stud and as the head of the stud bears against the inclined face of the wedge it is forcibly drawn inwardly and pulls the end of the cross tube firmly up against the side of the pillar. The wedge screw can be turned by a suitable long driving tool inserted in the pillar.

In the securing device for attaching the corner fastening member C on the pillar, the stud D' is preferably an integral projecting part of the fastening member C and is made with a reduced waist portion to enter the narrow part of the key-hole slot in the wedge E'. Both the stud and the wedge in this device are preferably made larger and stronger than the corresponding parts in the device for securing the cross tubes on account of the greater strains to which they are subjected. Otherwise the two securing devices are substantially alike.

A permanently attached stud, such as D', could also be employed on the cross tube, but the screw D is preferred as it can be adjusted to project to a greater or less distance from the end of the tube as may be required to compensate for differences in the thickness of the wedges or other slight variations in the parts in order to insure a tight firm connection.

The securing device described is readily applied and insures a firm rigid connection between the tubes which it connects, and it does not in any way disfigure the tubes. It is much more desirable for securing the corner fastening members to the pillars than the old methods employed, in which the fastening member surrounds the pillar and is squeezed or compressed to hold it in place, or in which the fastening member is cast onto or into the pillar.

We claim as our invention:

1. The combination with a tube and a device to be secured on the side thereof, of a stud which is secured to said device and is adapted to project into said tube through a hole in the side of the tube, a wedge which is separate from said tube and device and is movable lengthwise in said tube between one side thereof and a part of said stud for drawing said device firmly against the outer side of the tube, and a screw mounted on said wedge and adapted to be screwed against said stud to forcibly move said wedge lengthwise between the side of the tube and said part of the stud and lock said wedge in place, substantially as set forth.

2. The combination with a tube and a device to be secured on the side thereof, of a headed stud which is secured to said device and is adapted to project into said tube through a hole in the side of the tube, a wedge which has a slot through which said stud extends and which is movable lengthwise inside of said tube between the side thereof having said hole and the head of said stud, the head of said stud bearing on the inclined face of the wedge, and a screw working in a threaded hole in said wedge and adapted to be screwed against said stud to forcibly move said wedge lengthwise between the side of the tube and the head of said stud and lock the wedge in place, substantially as set forth.

3. The combination with a tube and a device to be secured on the side thereof, of a stud which has a screwthreaded engagement with said device and a head adapted to project into said tube through a hole in the side of the tube, a wedge which is separate from said tube and said device and is movable lengthwise in said tube between one side thereof and the head of said stud for drawing said device firmly against the outer side of the tube, and a screw mounted on said wedge and adapted to be screwed against said stud to forcibly move said wedge lengthwise between the side of the tube and the head of said stud and lock said wedge in place, substantially as set forth.

Witness our hands, this 25th day of March, 1909.

CHARLES VALLONE.
FRANK R. ROGERS.

Witnesses:
C. W. PARKER,
C. B. HORNBECK.